United States Patent [19]

Hauser et al.

[11] Patent Number: 4,814,441

[45] Date of Patent: Mar. 21, 1989

[54] FINELY DIVIDED TRANSPARENT METAL-FREE X-PHTHALOCYANINE

[75] Inventors: Peter Hauser, Limburgerhof; Volker Radtke, Hassloch, both of Fed. Rep. of Germany

[73] Assignee: BASF Aktiengesellschaft, Ludwigshafen, Fed. Rep. of Germany

[21] Appl. No.: 123,236

[22] Filed: Nov. 20, 1987

[51] Int. Cl.$^4$ ............................................. C09B 47/30
[52] U.S. Cl. .................................................. 540/122
[58] Field of Search ......................................... 540/122

[56] References Cited

U.S. PATENT DOCUMENTS

| | | | |
|---|---|---|---|
| 3,357,989 | 12/1967 | Byrne et al. | 540/122 |
| 3,594,163 | 7/1971 | Radler | 540/122 X |
| 3,657,272 | 4/1972 | Brach et al. | 540/122 |
| 3,862,127 | 1/1975 | Miller et al. | 540/122 |
| 3,932,180 | 1/1976 | Griffiths et al. | 540/122 X |
| 4,098,795 | 7/1978 | Griffiths et al. | 540/122 |

FOREIGN PATENT DOCUMENTS 2415753 10/1975 Fed. Rep. of Germany .
2516054 10/1976 Fed. Rep. of Germany .

OTHER PUBLICATIONS

Pigment Handbook, vol. 3, pp. 157–167 (1973).
Farbe and Lack, vol. 83 (1977), pp. 886–890.
Farbe und Lack, vol. 76 (1970), pp. 545–550.

*Primary Examiner*—Richard L. Raymond
*Attorney, Agent, or Firm*—Oblon, Fisher, Spivak, McClelland & Maier

[57] ABSTRACT

Finely divided, transparent, metal-free X-phthalocyanine has a specific surface area of from 75 to 120 m$^2$g and not less than 80% by weight of the phthalocyanine particles have a Stokes-equivalent diameter of $\leq 0.12$ μm.

The phthalocyanine is very useful as a pigment for printing inks and finishes.

3 Claims, No Drawings

FINELY DIVIDED TRANSPARENT METAL-FREE X-PHTHALOCYANINE

The present invention relates to a novel pigmentary form of the metal-free X-phthalocyanine and its use as a pigment.

U.S. Pat. No. 3,357,989 describes a metal-free X-phthalocyanine. It is prepared by treating α-phthalocyanine with sulfuric acid. After the reaction product has been separated from the sulfuric acid, it is subjected to dry milling.

U.S. Pat. No. 3,594,163 relates to another process for the preparation of a metal-free X-phthalocyanine, in which a small amount of metal-free X-phthalocyanine is mixed with commercial metal-free α-phthalocyanine, and this mixture is stirred or milled in an inert solvent at about 25° C.

It is an object of the present invention to provide a pigmentary form which is very similar to Milori blue (C.I. Pigment Blue 27; C.I. No. 77,510) in tinctorial properties without having its disadvantageous performance characteristics.

We have found that this object is achieved by the pigment of the present invention.

Accordingly, the present invention relates to a finely divided, transparent metal-free X-phthalocyanine which has a specific surface area of from 75 to 120 m$^2$/g and in which not less than 80% by weight of the phthalocyanine particles have a Stokes-equivalent diameter of $0.12 \leq \mu m$.

The novel X-phthalocyanine is advantageously obtained if α-phthalocyanine is first converted by intensive dry milling into a mixture which consists of the α- and the X-modification. The content of X-phthalocyanine should be from 40 to 75% by weight, based on the mixture.

The mixture is then treated with a solvent. For this purpose, the α X-phthalocyanine mixture is stirred in an inert organic solvent at from 20° C. to the boiling point of the solvent for about 2-6 hours. Thereafter, the resulting X-phthalocyanine is separated from the solvent, washed with water and dried.

The dry milling process is advantageously carried out in a mill, for example in a ball mill, planetary mill, rotary tubular mill or vibratory mill at from 40° to 80° C. The grinding medium used may consist of spheres, cylinders or cones of hard-wearing and abrasion-resistant materials, such as steel, zirconium oxide or agate.

For example, alcohols, in particular alkanols, such as methanol, ethanol, propanol, isopropanol, butanol, isobutanol, sec-butanol, tert-butanol, pentanol or hexanol, ketones, such as acetone, methyl ethyl ketone or methyl isobutyl ketone, ethers, such as methyl tertbutyl ether, glycol mono-C$_1$-C$_4$-alkyl ethers and their esters, such as ethylene glycol monobutyl ether or its acetate, or tetrahydrofuran, and carbonitriles, such as acetonitrile, and mixtures of these solvents are suitable for the solvent treatment.

Particularly advantageous solvents are ethanol, propanol, isopropanol, butanol, isobutanol, methyl ethyl ketone, methyl isobutyl ketone, ethylene glycol monobutyl ether, its acetate, tetrahydrofuran and mixtures of these.

In order to suppress the formation of β-phthalocyanine, it has proven advantageous in some cases to carry out the treatment with the inert organic solvent also in the presence of water, the amount of water being from 20 to 60% by weight, based on the liquid system.

It may also be advantageous if the solvent treatment is also carried out in the presence of crystallization-inhibiting additives and assistants, as described in, for example, DE-A-Nos. 2,516,054 or 2,415,753 or in Pigment Handbook, Vol. 3, pages 157 et seq., John Wiley and Sons, New York, 1973. It may furthermore be advantageous to add recrystallization-inhibiting additives and assistants to the novel finely divided, transparent, metal-free X-phthalocyanine in order to suppress its recrystallization during subsequent use in solvent-containing binder systems.

X-ray analysis of the novel product shows that it consists exclusively of the X-modification. However, it is in a considerably more finely divided state than the known X-phthalocyanine.

Accordingly, the novel finely divided, transparent, metal-free X-phthalocyanine has a substantially higher specific surface area than the corresponding prior art products. While the novel X-phthalocyanine has a specific surface area of from 75 to 120 m$^2$/g, a product prepared similarly to Example 1 of U.S. Pat. No. 3,594,163 has a value of 50 m$^2$/g, and a product prepared similarly to Example 1 of U.S. Pat. No. 3,357,989 has a value of 6 m$^2$/g. In the X-phthalocyanine obtained as described in Example 1 of U.S. Pat. No. 3,594,163, 80% by weight of the particles have a Stokes-equivalent diameter of $\leq 0.18 \mu m$.

The specific surface area is measured by nitrogen adsorption according to DIN 66,131. The mean particle diameter of the crystals can be estimated from electron micrographs. Critical for the tinctorial characteristics, however, are the volume-related distributions of the diameters of the particles, i.e. of the crystals, the crysalline aggregates and the agglomerates, which are determined for dispersed samples of the X-phthalocyanines using a disk centrifuge (Farbe+Lacke 83 (1977), 886 et seq. and 76 (1970), 545 et seq.). For this purpose, 3 g of pigment are dispersed with 7 g of Grindingbase 100 ® (Lawter Chemicals) on a laboratory three-roll mill (Buhler) in two passes under a nip pressure of 5 bar and, if necessary, in further passes under a nip pressure of 15 bar until the particle sizes are less than 5 μm, measured with the grindometer (DIN 53,203). Thereafter, the paints containing 30% by weight of pigment are diluted with a resin solution of 10 parts of Albertol KP 648 ® (Chemische Werke Albert, Wiesbaden), 65 parts of Solveno ® (BASF) and 25 parts of chloroform to 0.2% by weight of pigment. These dilute pigment dispersions are subjected, as described in Fabe+Lacke, to sedimentation analysis in the disk centrifuge, from which volume-related distributions of the Stokes-equivalent diameters are determined. All subsequently mentioned X-phthalocyanines of the Examples (1 to 6) have virtually monomodal, logarithmic distributions (DIN 66,144) which are characterized by stating the median diameters d$_{50.3}$ and the standard deviation s. These fineness parameters are regarded as capable of specifying pigments and are listed in the Table for Examples 1 to 6, in addition to the specific surface areas.

The novel phthalocyanine can advantageously be used as a pigment.

For example, it may advantageously be used as a pigment in coatings, where it is very similar in hue to Milori blue without having its disadvantageous performance characteristics.

It is known that Milori blue (also known as Prussian blue, ferrocyanide blue, C.I. Pigment Blue 27; C.I. No. 77,510) is principally used in automotive finishes. It is predominantly used there for deep, bluish black solid coats. Its colour properties alone are decisive for this purpose, since it has a deep, dark and especially greenish blue full shade. In its other performance characteristics, however, the pigment has a number of disadvantages.

In spite of the name nonbronze blue, which is also often used for it, Milori blue does in fact tend to bronze relativey rapidly. Moreover, it reduces the pot life of two-component coatings. The pigment is only moderately resistant to alkalis and oxidizing and reducing agents. It frequently changes its hue within the first 24 hours after application and is only moderately weather-resistant in conventional, ie. solvent-rich, coatings and is unsuitable in some high solids systems owing to its weathering properties. Furthermore, it cannot be used in waterborne base coats because the aqueous latices and dispersions used there coagulate in the presence of Milori blue.

There has therefore been no lack of attempts to date to find substitutes for Milori blue which have identical or very similar tinctorial properties coupled with advantageous performance characteristics.

For example, highly transparent forms of α-copper phthalocyanine (C.I. Pigment Blue 15:1 and 15:2) have been used. When applied in a high-hiding coat, these pigments have a deep and dark hue. Compared with Milori blue, however, its scattering power is still relatively high. Such coatings therefore do not possess the desired greenish blue hue but a reddish blue shade. This is attributable to the scattering power of the CuPc crystals (11th Fatipec Congress 1972, Edizioni Ariminum, Milan 1972, page 551 et seq.).

Another possibility of replacing Milori blue in deep blue solid shades was to use the nonflop blues. These are α-copper phthalocyanines having a high chlorine content (from 5 to 14% by weight). This high chlorine content causes a shift in hue toward green in the full shade and in the white reduction. Compared with the highly transparent forms of the α-copper phthalocyanine, these pigments give full-shade coatings which are deeper, darker and less reddish but, in comparison with Milori blue, still have an undesirable reddish hue in the coatings, since the back-scattering power of the nonflop blues is higher than that of Milori blue.

In high-hiding full-shade coats, a high back-scattering power leads to high reflectivity. For example, the reflectivity of the full-shade coat of a highly transparent α-copper phthalocyanine and of a nonflop blue (chlorine content 13% by weight) is 2% at 458 nm and 2.15% at 474 nm and is thus substantially higher than the reflectivity of a Milori blue full-shade coat which, with 0.1% (in the same wavelength range), very closely approaches a black coat.

In contrast, the novel finely divided X-phthalocyanine has an extremely small scattering power. Full-shade coatings produced using the finely divided, transparent metal-free X-phthalocyanine have virtually no reddish hue.

The reflectivity of the full-shade coat of the novel finely divided, transparent, metal-free X-phthalocyanine is 0.5% (at 460 nm) and is thus extremely similar to that of Milori blue. Compared with the latter, the full-shade coats of prior art metal-free X-phthalocyanine (U.S. Pat. No. 3,357,989, Example 1 and U.S. Pat. No. 3,594,163, Example 1) are substantially higher at 1.15% (at 460 nm) and 1.92% (at 470 nm).

Examples of suitable coating binders in which the novel metal-free X-phthalocyanines may be used are air-drying systems, for example long-oil alkyd resins or nitrocellulose finishes; baking systems based on short-oil or middle-oil alkyd resins, polyesters or acrylate resins (thermosetting and thermoplastic acrylics) in combination with amino resins, such as urea resins or melamine resins; two-component systems, for example polyurethanes or epoxy resins and combinations of these systems. Aqueous binders based on primary and secondary dispersions and microgels are further examples.

If, for example, the novel X-phthalocyanine is combined with small amounts of titanium dioxide, as also occurs when Milori blue is used in practice, deep greenish blue-black coatings are obtained which show virtually no differences compared with those based on Milori blue. Such combinations can, for example, also be dispersed and processed in waterborne basecoats in which Milori blue results in coagulation of the binder. (Water-dilutable coating materials for the production of two-coat finishes are described in, for example, EP-A-Nos. 28,886 and 38,127).

To characterize the novel finely divided, transparent metal-free X-phthalocyanine under conditions in practice, the colorimetric evaluation of the color difference of high-hiding full-shade spray coatings against a black standard can be used. The greater the ΔE value measured accordingto DIN 6,174, the greater the extent to which the relevant pigment deviates from a neutral black. The products produced by the prior art methods (U.S. Pat. No. 3,357,989 and U.S. Pat. No. 3,594,163) have a much redder and paler full shade than the novel pigments and accordingly possess a substantially higher ΔE value, in agreement with the visual assessment. Finely divided α-copper phthalocyanines and nonflop blues also have substantially higher ΔE values than the phthalocyanines according to the invention.

Although, as stated above, the novel finely divided transparent metal-free X-phthalocyanines as full shades still have a somewhat higher scattering power than Milori blue, they do not have its disadvantageous performance characteristics. They thus constitute a technically advantageous alternative to Milori blue in the coatings sector.

The novel pigment can also advantageously be used for printing inks. The printing ink sector has been dominated to date in the blue (cyan) area by β-copper phthalocyanines in liquid and oily, pasty inks. Although these pigments are relatively economical and have a high color strength and lightfastness, they nevertheless have a few disadvantages. First, the presence of copper may be mentioned. These products may contain ionic copper from the synthesis, this copper being water-soluble and capable of destroying the microorganisms in wastewater treatment plants. The other disadvantages of β-copper phthalocyanines include their tendency to bronze and the drift in hue with changing levels of pigmentation.

On the other hand, the novel products are free of heavy metals. Moreover, the X-phthalocyanine according to the invention has less tendency to undergo bronzing than β-copper phthalocyanine. Finally, its hue in the print is virtually independent of the level of pigmentation, whereas the shade in the case of β-copper phthalocyanine becomes increasingly reddish with increasing pigmentation.

Examples of printing inks in which the novel X-phthalocyanines may be used are gravure printing inks for halftone gravure printing using toluene or gasoline as a solvent, aqueous and solvent-containing packaging printing inks based on nitrocellulose, acrylates, maleates or polyurethanes and combinations of these systems. Other examples are oily, pasty offset inks for rotary offset printing and sheet-fed offset printing.

The novel product can also advantageously be used as a pigment for thermoplastics or heat-setting plastics, such as high density polyethylene, low density polyethylene, polypropylene, soft and hard PVC, polystyrene, terpolymers of styrene, butadiene and acrylonitrile (ABS), polyphenylene oxide and nylons.

The Examples below illustrate the invention.

The physical data determined for the pigments of Examples 1 to 6, i.e. specific surface area $SN_2$, median diameter $d_{50.3}$, standard deviation s, and d for accumulative undersize of 80% by weight of the particles, are summarized in the Table after Example 6.

EXAMPLE 1

(a) A phthalocyanine of the β-form having a phthalocyanine content of 96% by weight was first converted (as described in U.S. Pat. No. 3,357,980, Example 1) into finely crystalline α-phthalocyanine by reprecipitation from concentrated sulfuric acid in water, washing neutral with water, washing out byproducts with acetone and then drying at room temperature. The yield of α-phthalocyanine was 81.5%, based on the amount of α-phthalocyanine used.

(b) 50 g of α-phthalocyanine from (a) were introduced into a 840 ml steel container which was about half filled with steel balls (diameter 15 mm) and dry-milled for 40 hours at a jacket temperature of 40° C. on a laboratory vibratory mill which vibrates at 25 Hz at a stroke of about 1.5 mm. A mixture of the α- and X-form of the phthalocyanine in a weight ratio of 40:60 was formed (yield: 48 g).

(c) 10 g of the mixture of α- and X-modifications from (b) were introduced into a 500 ml three-necked glass flask which was filled to about 40% by volume with glass spheres (diameter 3 mm) and with 200 g of methyl ethyl ketone. The entire batch was stirred at 70 rpm for 5 hours at 25° C. The pigment suspension was filtered over a suction filter and washed several times with distilled water, and the product was filtered off under suction and dried at room temperature to give 9.2 g of pigment. The X-ray diffraction pattern (recorded using CuKα radiation) identified the resulting pigment powder as a pure X-phthalocyanine having the 2σ diffraction angles at 7.4, 9.0, 16.6, 17.25, 22.1 and 28.35, typical for the X form. This was extremely finely divided pigment. The fineness can be demonstrated by the specific surface area of 92 $m^2/g$ ($N_2$ adsorption on the pigment powder according to DIN 66,131).

EXAMPLE 2

(Comparison, similar to Example 1 of U.S. Pat. No. 3,594,163)

92 g of the α-phthalocyanine obtained by reprecipitation from sulfuric acid as described in Example 1 were mixed with 8 g of the α/X phase mixture (corresponding to 5% by weight of X-phthalocyanine) obtained in Example (1b), and the mixture was treated in methyl ethyl ketone at 25° C. for 16 hours as described in Example 1c). 95 g of a X-phthalocyanine were obtained. Its specific surface area was only 50 $m^2/g$.

EXAMPLE 3

(a) 3,200 g of β-phthalocyanine were introduced into each of the two grinding chambers of a Palla ® 20 U vibratory mill (Klöckner-Humboldt-Deutz, Cologne). Each grinding tube having a capacity of 23 l was about ⅔ filled with steel balls (diameter 20 mm). The entire batch was treated for 48 hours at a jacket temperature of 65° C., the mill-specific circular vibration being 1,000 rpm and the diameter of the vibration circle being 10 mm. X-ray diffraction analysis showed that the discharged pigment (6.28 kg) was a mixture of the α- and X-forms (weight ratio about 50:50), in which no β-form was detectable.

(b) 600 g of methyl ethyl ketone were initially taken in a 1,000 ml three-necked round-bottomed flask, and 30 g of the above α/X mixture were introduced. The suspension was heated to the boil (80° C.) under the stirring conditions stated in Example 1 and refluxed for 4 hours, in the absence of a grinding medium. Cooling, filtration of the pigment suspension under suction, copious washing with water and subsequent drying gave a pigment powder (yield: 90%). X-ray diffraction indicated the pure X-form of the metal-free phthalocyanine. The specific surface area was 101 $m^2/g$. This was an extremely finely divided pigment.

EXAMPLE 4

30 g of the mixture of α- and X-modifications obtained by milling as described in Example (3a) were treated as described under (b) but in 600 g of isobutanol at the boiling point (108° C.). After isolation, a phthalocyanine pigment (yield: 92%) of the pure X-form having a specific surface area of 91 $m^2/g$ was obtained.

EXAMPLE 5

The procedure described in Example 4 was followed, except that 1.5 g of a salt of trisdiethylaminoethylene-copper phthalocyanine and dodecylbenzenesulfonic acid (molar ratio 1:3) were introduced together with 28.5 g of the mixture of the α- and X-modification into the isobutanol. After the usual isolation, the resulting pigment powder (yield: 93.5%) was found to be in the pure X-form according to X-ray diffraction analysis. The specific surface area was 93 $m^2/g$.

EXAMPLE 6

30 g of the α/X phase mixture of the phthalocyanine, obtained as described in Example (3a), were stirred for 6 hours at 89° C. in a mixture of 450 g of isobutanol and 150 g of water. The pigment powder isolated (yield: 92%) was found to be a metal-free X-phthalocyanine according to X-ray diffraction analysis. The specific surface area was 99 $m^2/g$.

TABLE

Particle size and particle distribution in Grinding Base 100 S letterpress varnish

| Example | Specific surface area $SN_2$ [$m_2/g$] | Median diameter $d_{50.3}$ [μm] | Standard deviation s | d for Q = 0.80[1] [μm] |
|---|---|---|---|---|
| 1 | 92 | 0.07 | 0.25 | 0.09 |
| 2 (prior art) | 50 | 0.13 | 0.35 | 0.18 |
| 3 | 101 | 0.07 | 0.23 | 0.09 |
| 4 | 91 | 0.07 | 0.23 | 0.09 |
| 5 | 93 | 0.05 | 0.28 | 0.07 |

TABLE-continued

Particle size and particle distribution in Grinding Base 100 S letterpress varnish

| Example | Specific surface area $SN_2$ [m²/g] | Median diameter $d_{50.3}$ [μm] | Standard deviation s | d for Q = 0.80[1] [μm] |
|---|---|---|---|---|
| 6 | 99 | 0.06 | 0.25 | 0.08 |

[1] Q = 0.80 = cumulative undersize for 80% by weight, ie. 80% by weight of the particles have a Stokes-equivalent diameter of ≤d.

EXAMPLE 7

5 g of a single-phase, finely divided, metal-free X-phthalocyanine, obtained as described in Example 5, were introduced, together with 95 g of an alkyd/melamine coating (short-oil alkyd resin obtained from synthetic isononanoic acid, phthalic anhydride and trimethylolpropane in xylene and butylated melamine/formaldehyde in xylene/butanol), into a 370 ml packaging glass with a twist-off cap, containing 100 ml of glass spheres (diameter about 3 mm) as a grinding medium, and were dispersed for 1 hour on a laboratory shaking machine (Red Devil ®). The resulting low-viscosity coating was diluted with xylene to spray viscosity, sprayed onto primed steel sheets, dried in the air for 15 minutes and then baked for 30 minutes at 30° C. A deep, bluish black coating having a high gloss was obtained.

EXAMPLE 8

5 g of a single-phase, finely divided, metal-free X-phthalocyanine, prepared as described in Example 6, and 0.25 g of trisdiethylaminomethylenecopper phthalocyanine (as a recrystallization-inhibiting agent) were dispersed in 95 g of a thermosetting acrylate resin (35% strength by weight in xylene) for 1 hour in a 370 ml glass bottle on the Red Devil, using 100 ml of glass spheres (diameter 3 mm). After cooling, the dispersion was completed with 20 parts of a reactive melamine/formaldehyde resin in butanol/xylene. The blue baking finish thus prepared was brought to spray viscosity with xylene and sprayed onto primed steel sheets. Baking was carried out for 30 minutes at 130° C. to give a bluish black coating having a high gloss.

EXAMPLE 9

15 g of the metal-free phthalocyanine prepared as described in Example 5, 62.5 g of a 50% strength by weight solution of a hydroxyl-containing acrylate resin in 2:1 xylene/ethylglycol acetate and 37.5 g of a solvent mixture consisting of 50% by weight of methyl ethyl ketone, 40% by weight of xylene and 10% by weight of ethylene glycol monoethyl ether acetate were dispersed for 1 hour in a 370 ml glass with 125 ml of glass spheres (diameter: 3 mm) on the Red Devil. After the milling procedure, a further 74.5 g of the solution of the acrylate resin were added.

The finished mill base was completed with 31.5 g of a 75% strength by weight solution of an aliphatic diisocyanate in methoxypropyl acette/xylene. The product was brought to spray viscosity with the abovementioned solvent mixture, after which the finish was sprayed onto primed steel sheets.

After drying in the air for 15 minutes at room temperature, hardening was carried out at 80° C. to give a deep blue coating which did not differ significantly from a comparison coloration with Milori blue in depth of shade and in hue.

EXAMPLE 10

500 g of high pressure polyethylene, 5 g of titanium dioxide, 0.5 g of the product from Example 5 and 0.015 g of trimethylenediethylaminocopper phthalocyanine were dry-blended in a drum mixer. The mixture was introduced into the feed hopper of a preheated injection molding machine and molded to 4×6 cm panels. The injection temperature was initially 200° C. and was then increased to 280° C. in steps of 20° C. The residence time prior to injection was 5 minutes.

This procedure gave greenish blue panels. The pigment used was stable up to 260° C. (colorimetric evaluation according to DIN 6,174: ΔE<3, compared with a molding produced at 200° C.).

EXAMPLE 11

12 g of metal-free X-phthalocyanine, prepared as described in Example 5, were dispersed in 88 g of a solution of a phenol-modified rosin in toluene (solids content about 35% by weight, efflux time in DIN 4 cup: 14 sec) for 30 minutes on the Red Devil, in a polyethylene beaker with the addition of 300 g of steel balls (diameter 2-3 mm). After cooling to room temperature, the dispersion was diluted with binder solution to a pigment content of 8% by weight. The printing ink produced in this manner was applied to parchment paper with a knife coater. A deep blue color was obtained which was deeper by about 20%, somewhat greener and duller compared to a comparison coloration with β-copper phthlocyanine.

Metal-free α-phthalocyanine dispersed in the same manner and supplemented with a pigment as in the case of the pigment from Example 5 had a substantially greener hue and about 10% lower color strength.

EXAMPLE 12

18 g of finely divided X-phthalocyanine, prepared as described in Example 1, were initially predispersed for 10 minutes in 82 g of a varnish for sheet-fed offset printing, consisting of 38 g of a rosin-modified resin, 42 g of refined linseed oil, 20 g of a mineral oil having a boiling point of from 260° to 290° C., in a dissolver and then finely dispersed on a three-roll mill (3 passes under 15 bar). An 18% strength by weight ink for sheet-fed offset printing was obtained. In combination with TiO₂ (1:20), the novel pigment from Example 1 proved to have a color strength 20% higher than that of a β-copper phthalocyanine and a somewhat greener and duller hue. A prior art metal-free α-phthalocyanine has a color strength which is about 10% lower than that of the novel pigment and has a substantially greener hue.

In the Fogra print (printing inks with pigment concentrations of 18, 15, 10 and 5% by weight were printed in different film thicknesses on coated paper; apparatus: Prüfbau, Dr. Dürner), the novel pigment had a hue which was substantially independent of the pigment concentration and film thickness (ΔH according to DIN 6,174=5, depth of shade characteristic B: −16 to +16 at ⅓ standard depth of shade). Even in the case of the abovementioned prior art metal-free α-phthalocyanine, the shift in hue in the abovementioned range was only 6 units, whereas for β-copper phthalocyanine the shift in hue was 18 units (ΔH=18).

EXAMPLE 13

The procedure described in Example 12 was followed, except that a 17.5% strength by weight solution of an alcohol-soluble nitrocellulose (in 3:1 ethanol/ethyl acetate) was used as the binder. After the dispersing procedure, the product was diluted to a pigment content of 6% by weight and brought to a printing viscosity of 25 sec/DIN 3 cup with ethyl acetate/alcohol. A gravure print on coated paper was then prepared on a hand printing press (depth of the wells: 34, 24 and 16 μm).

The resulting intense bluish green colorations had very good gloss and, according to colorimetric evaluation, were 10% deeper and somewhat greener and duller than comparative colorations with a β-copper phthalocyanine.

EXAMPLE 14

15 g of phthalocyanine, prepared as described in Example 4, were dispersed in 135 g of 14% strength by weight solution of an acrylate resin in dilute 5:2 ammonia/isopropanol for 1 hour on a Red Devil in a 300 ml polyethylene beaker with the addition of 300 g of steel balls (diameter 2-3 mm). The resulting low-viscosity printing ink showed virtually no change in hue, color strength and viscosity on storage for 3 days at 50° C.

When applied to chemical wood paper by means of a knife coater, this printing ink gave colorations which were substantially redder and deeper than those obtained with the α-modification of the metal-free phthalocyanine and were thus closer in hue to β-copper phthalocyanine.

We claim:

1. A finely divided, transparent, metal-free X-phthalocyanine, wherein the said phthalocyanine has a specific surface area of from 75 to 120 $m^2/g$ and not less than 80% by weight of the phthalocyanine particles have a Stokes-equivalent diameter of $\leq 0.12$ μm.

2. A finely divided phthalocyanine as claimed in claim 1, which has a Stokes-equivalent diameter of $\leq 0.10$ μm.

3. A finely divided phthalocyanine as claimed in claim 1, which has a Stokes-equivalent diameter of $\leq 0.095$ μm.

* * * * *

UNITED STATES PATENT AND TRADEMARK OFFICE
CERTIFICATE OF CORRECTION

PATENT NO. : 4,814,441

DATED : Mar. 21, 1989

INVENTOR(S) : Peter HAUSER, et al.

It is certified that error appears in the above-identified patent and that said Letters Patent is hereby corrected as shown below:

Title page:

The following Foreign Application Priority Data should appear on the Title page:

Nov. 27, 1986 [DE] Fed. Rep. of Germany..........3640592

Signed and Sealed this

Twenty-sixth Day of December, 1989

Attest:

JEFFREY M. SAMUELS

Attesting Officer     Acting Commissioner of Patents and Trademarks